United States Patent [19]

Prusinski et al.

[11] 4,160,761

[45] Jul. 10, 1979

[54] PLASTIC ARTICLES

[75] Inventors: Richard C. Prusinski; Jan R. Prusinski, both of Dearborn, Mich.

[73] Assignee: Architectural Research Corporation, Livonia, Mich.

[21] Appl. No.: 902,668

[22] Filed: May 4, 1978

[51] Int. Cl.² .............................................. C08J 5/00
[52] U.S. Cl. .............................. 260/42.47; 428/150; 428/454
[58] Field of Search ............... 428/95, 150, 306, 310, 428/315, 454; 260/37 R, 42.47

[56] References Cited

U.S. PATENT DOCUMENTS

| 3,766,134 | 10/1973 | Dalal | 260/42.47 |
| 4,101,050 | 7/1978 | Buckler et al. | 260/37 R |
| 4,116,909 | 9/1978 | Muller | 260/42.47 |

*Primary Examiner*—William J. Van Balen
*Attorney, Agent, or Firm*—Whittemore, Hulbert & Belknap

[57] ABSTRACT

Plastic articles of the type utilized in floor and highway markings and in constructing industrial flooring for the support of heavy machinery and vehicle traffic among others are provided. These articles are filled resinous articles fabricated of recycled thermoplastic resinous materials which may contain impurities.

3 Claims, 1 Drawing Figure

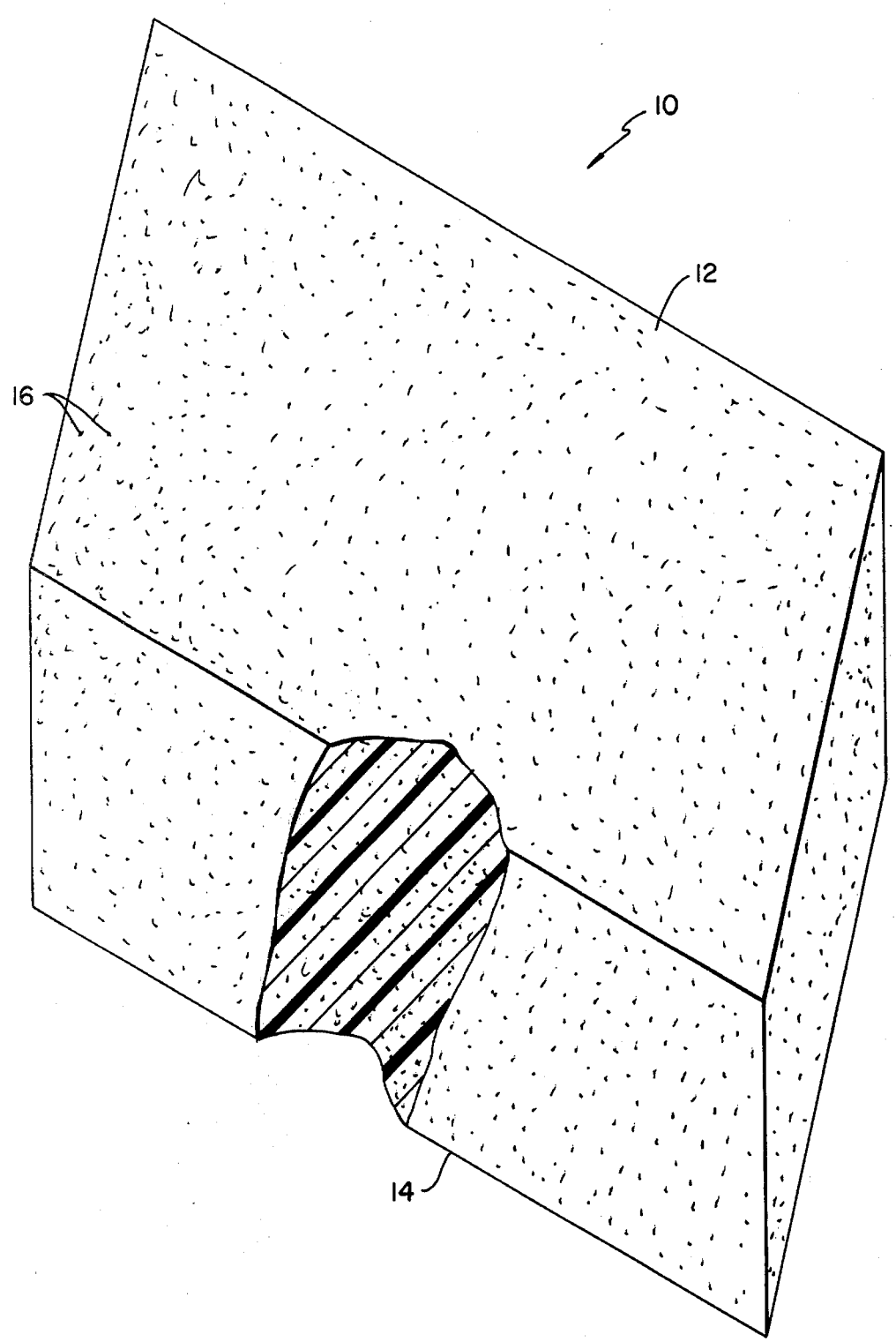

PLASTIC ARTICLES

BACKGROUND OF THE INVENTION

There are available large amounts of scrap thermoplastic resinous materials for which there is currently no major usage. Such resinous materials represent a potentially valuable resource but because there has not been a practical way of utilizing such materials, the materials have provided a storage problem and a disposal problem for the various manufacturing concerns which generate them.

One source of non-recycleable thermoplastic materials is acrylonitrile-butadiene-styrene scrap. This material is commonly referred to as ABS plastic. Various components are fabricated of ABS plastic for automobile use. These components are normally coated to give the appearance of a metallic finish.

Scrap pieces occurring during manufacture are normally shredded and stored adjacent the manufacturing facility or elsewhere. Large piles of such material are in existence adjacent various manufacturing facilities. This material, although relatively pure with reference to the plastic content, cannot be recycled because of the presence of the metallic coating thereon.

Another source of non-recyceable thermoplastic material is vinyl. Vinyl is widely used in the automotive industry for manufacturing seat covers. Such seat covers are formed in a continuous basis with a throw-away segment connecting adjacent seat covers after initial manufacture. This throw-away portion is clipped from the seat covers before the seat covers are formed into the final usage configuration. Large amounts of such vinyl scrap are readily available.

The present invention contemplates utilization of these materials in conjunction with the manufacture of novel plastic articles of the type utilized, for example, in floor and highway markings, industrial flooring for the support of heavy machinery and vehicle traffic, replacements for asphalt block (which is conventionally 1-$\frac{1}{2}"\times 8"\times 12'$), odd-sized patio stones, and the like. As above stated, one usage for such surface blocks is in connection with marking of floors and highways. Currently, road markings are placed on highways by means of paint. Center stripes are made of both white and yellow paint. Edges are commonly painted white. It is expensive to maintain such highway markings. Relatively thin surface blocks of durable characteristics can be made in the desired colors inexpensively enough for use in connection with highway markings. The blocks are to be implanted permanently in the highway. Similarly, floor markings on industrial floors which may be asphalt or the like may also utilize such relatively thin blocks.

Another type of application for the blocks is in the area of industrial flooring. Two types of industrial floors are currently in general use: concrete floors and block floors. Block floors have generally comprised wood blocks laid onto, in the usual case, a concrete sub-floor. Asphalt blocks have also been used.

The choice of using either a concrete floor or a block floor depends upon the usage to which a floor is to be placed. If the floor is to be used mainly for light machinery and light traffic, a concrete or asphalt floor is generally sufficient. However, if heavy machinery and heavy traffic are to be encountered in use, then wood block flooring has in many cases been preferred. There is an intermediate area of usage where the type of flooring has been discretionary depending upon the design attitudes of the industrial engineer or architect.

A concrete floor has some advantages over a wood block floor under certain conditions. Firstly, it is less expensive to maintain provided it does not become damaged by heavy machinery or heavy traffic. Additionally, it is less expensive to use a concrete floor inasmuch as wood block flooring is generally supported on a concrete sub-floor.

Wood block flooring has a number of advantages over a concrete floor. Firstly, wood blocks are easily replaced if the flooring is damaged. Wood blocks are non-dusting whereas concrete, when gouged or crushed, results in dust which may damage machinery and is a nuisance factor to workers. Within a given factory area, it is usually necessary to move machinery about from time to time. Wood block floors are less severely damaged by machinery being slid thereover. Additionally, when a machine is moved, it is generally required to provide ancillary service installation such as in-floor power lines and fluid lines. Wood blocks are easy to remove for installation of such service facilities. The resilience of wood results in foot comfort, noise dampening and vibration dampening. Further, wood is a thermal insulator and thus tends to reduce heating costs.

The present invention provides a filled resinous block in place of the standard wood block. The resinous blocks retain virtually all of the advantages of the wood blocks to a satisfactory extent, such as resiliency, thermal insulation, resistance to dusting and the like, while in addition providing advantages not obtainable with wood blocks.

For example, resinous blocks may be pigmented in different colors to facilitate laying out a floor with, for example, permanent yellow lane lines for defining roadways for vehicular traffic. Colored blocks may also be utilized to define usage areas such as storage areas, fire stations areas, shipping areas and the like. Pigmentation of the blocks results in a permanent pattern. It is necessary to frequently repaint the wood flooring in order to maintain such patterns. Additionally, wood blocks cannot be cleaned readily by washing or scrubbing because greasy and oily material impregnates the wood. It is necessary to use a grinding technique to grind off the top layer of the wood to eliminate the undesirable dirt materials. The resinous blocks of the present invention may be scrubbed clean by means of conventional scrubbing equipment.

Additionally, wood blocks are subject to expansion upon becoming wet. It is necessary to provide expensive sealing techniques for the cracks between the wood blocks in order to avoid water permeating beneath the blocks and causing undesirable expansion. Even with such techniques, it frequently occurs that water will seep underneath wood blocks and cause bubbling of large areas necessitating replacement of the wood blocks. The grinding-type cleaning technique utilized results in the thickness of the wood blocks gradually diminishing. Thus, when a floor area must be repaired with new wood blocks, the new wood blocks are thicker than the old wood blocks. This frequently requires replacing a much larger area than would be necessary if the blocks maintained substantially their original thickness.

Further, the resinous blocks of the present invention may be provided with roughened surfaces to improve traction on the upper surface and to improve bonding characteristics on the lower surface. Additionally, it is not necessary to seal the cracks between the resinous blocks with a sealant material. It has been found that such cracks or voids may be suitably filled by means of loose sand which is merely swept over a finished surface with the sand falling by gravity into the voids or cracks between adjacent blocks.

SUMMARY OF THE INVENTION

The plastic article comprises an article fabricated of a filled thermoplastic resinous material. The filled resinous material has a resin content comprising from 40% to 60%, by weight, of acrylonitrile-butadiene-styrene and from 40% to 60%, by weight, of vinyl. Filler particles are intermixed into a resinous material up to an amount of 50%, by weight, of the resinous material. The resinous material is recycled thermoplastic having intermixed therein solid waste particles acting as filler particles. The solid waste particles may include glass, cloth, metal and thermosetting resins. Silica sand is added as the additional filler.

IN THE DRAWING

The FIGURE is a perspective of a flooring block in accordance with one embodiment of the present invention.

DESCRIPTIONS OF PREFERRED EMBODIMENTS

Referring to the Figure, the flooring block 10 is generally rectangular in shape having, for example, dimensions of six inches in length, four inches in width and two inches in depth. The upper and lower surfaces 12, 14 are substantially parallel. The configuration of the flooring blocks may be varied.

The block 10 is fabricated of recycled thermoplastic resinous material having intermixed therein filler material.

One component of the resinous material is acrylonitrile-butadiene-styrene. This material is widely used in the automotive industry for forming various components. Frequently, the surface of such components is coated with chromium to achieve a metallic appearance. Such chromium coated material has in the past been useless for recycling because the chromium forms, for most applications, an undesireable impurity. However, in the present invention, the chromium remains in the mixture of resinous materials and forms a fill material.

Other organic material is also present because such other inorganic material generally is used by the original fabricator for fill purposes. Other metals may also be present, such as nickel, copper and lead. Chromium has been found to be present in amounts of up to 5.4%, by weight, while other inorganic materials have found to be present in an amount up to 13.4%, by weight.

The other resin component of the mixture is vinyl plastic. Such vinyl plastic is usually recovered from scrap remaining after automobile seat cover manufacture. Such scrap may also have fabric material therein which, again, may form part of the fill of the block 10. Vinyl plastic is meant to mean vinyl polymers and copolymers such as polyvinylchloride and copolymers thereof, chlorinated polyvinylchloride, polyvinylacetate, polyvinylidene chloride, polyvinylidene flouride, and polybutyrate.

The resinous mixture for fabricating the block 10 includes from 40% to 60%, by weight, of acrylonitrile-butadiene-styrene and from 40% to 60%, by weight, of vinyl plastic.

The recycled plastic material is first reduced to a form usable in a conventional processing technique such as compression molding, extrusion, or injection molding. These processes may require the material to be in pellet or in finely ground form. This is accomplished without attempting to remove the solid waste materials which are not thermoplastic resins. The processes used in forming the blocks 10 each involve the application of heat and pressure in a confined space to reduce the thermoplastic material to at least a viscous state.

Prior to processing the material into surface blocks, additional filler material is added. The total amount of filler material, including added filler material and the inherent solid waste material in the mixture, should equal from 40% to 60%, by weight, preferably 50%, of the weight of the resinous mixture. The amount of added filler material depends upon the percentage of solid waste material already in the mixture. Various conventional filler materials can be intermixed. The preferred added filler material is silica sand. This sand may be fresh sand or waste foundry sand. The filler may be combined with suitable pigments to provide a desired color in the finished block.

The sand serves two functions in addition to acting as an inexpensive fill. Firstly, it performs the usual function of reinforcing the resin to increase the over-all strength of the block. Secondly, sand provides a roughened exterior surface on the blocks as indicated at 16 in the figure. The roughened surface is of advantage on the top and bottom surfaces of the block. When provided on the top surface, it results in a non-skid type of surface for superior traction for vehicles and people. When provided on the lower surface, it results in superior bonding to the usual pitch material provided between the blocks and the usual concrete sub-surface.

What we claim as our invention is:

1. A plastic article comprising fabricated of a filled thermoplastic resinous material, said filled thermoplastic resinous material comprising recycled thermoplastic resinous material intermixed with solid waste particles, said thermoplastic resinous material having as one component acrylonitrile-butadiene-styrene in an amount of 40% to 60%, by weight, based on the weight of the resinous material, and as a second component vinyl plastic in an amount of from 40% to 60%, by weight, based on the weight of the resinous material, said resinous material having mixed therein solid waste particles and additional amounts of silica sand, said fill material, including both the solid waste particles and silica sand, being present in an amount from 40% to 60%, by weight, based upon the weight of the resinous material.

2. A plastic article as in claim 1, further characterized in that said fill material is present in an amount of about 50%, by weight, based upon the weight of the resinous material.

3. A plastic article as in claim 1, further characterized in that said resinous materials are present in about equal amounts by weight.

* * * * *